June 7, 1932. F. B. WALDRON 1,862,445
CONTINUOUS GLASS GRINDING AND POLISHING APPARATUS
Filed March 5, 1931
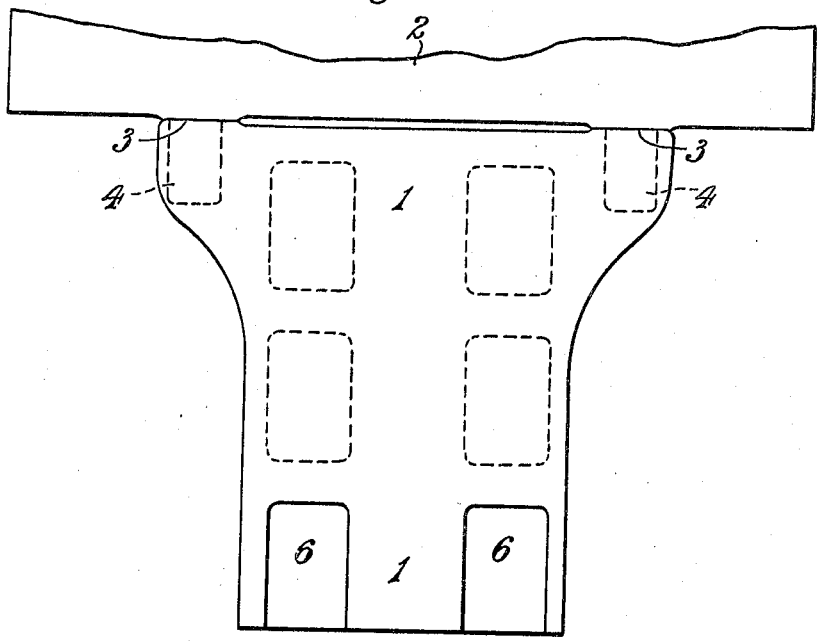
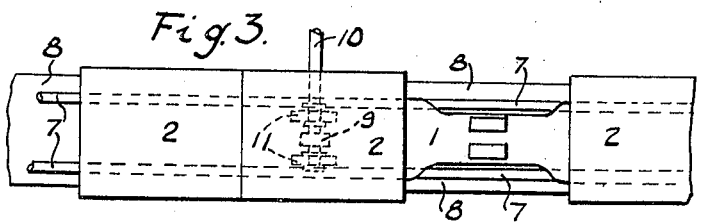
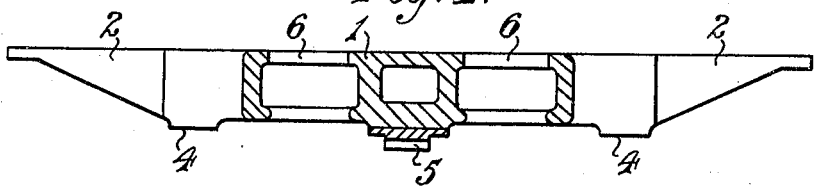

Patented June 7, 1932

1,862,445

UNITED STATES PATENT OFFICE

FREDERIC BARNES WALDRON, OF PRESCOT, ENGLAND, ASSIGNOR TO PILKINGTON BROTHERS LIMITED, OF LIVERPOOL, ENGLAND

CONTINUOUS GLASS GRINDING AND POLISHING APPARATUS

Application filed March 5, 1931, Serial No. 520,207, and in Great Britain March 18, 1930.

This invention relates to continuous glass grinding and polishing apparatus of the type in which a long series of tables carrying the glass, are moved continuously under a series of grinding and polishing tools, and has for its object apparatus whereby the guiding and other mechanisms under the tables can be examined without stopping the operations of the apparatus and whereby small repairs can be effected either without stopping the apparatus or with only a short stop.

In apparatus of this type in question, the majority of the tables are moved by pressure of one table on the next preceding table in the series, driving apparatus being provided either at the rear end only or at intervals along the series. It is therefore impossible to expose to view any portion of the table guides or mechanism without stopping the whole apparatus and, even when the apparatus is stopped, it is possible only with great expenditure of time and labour, by removing one table and shifting the others manually so as to move the gap along the length of the apparatus.

According to this invention a skeleton table is inserted in the series of tables in place of a work table and is so constructed as to give access to apparatus beneath the series of tables, such as the guiding means for the table and the bearings of the driving means.

In the accompanying drawing, Figure 1 is a plan view of half a table according to this invention, showing a portion of a work table, Figure 2 is a central transverse section thereof, and Figure 3 is a plan view on a reduced scale, showing a skeleton table forming part of series of work tables.

Referring to the drawing, 1 is the skeleton table and 2 a work table. The table 1 has the form of a light framework, broad enough at its ends to include end surfaces 3 adapted to abut against the end surfaces of the work tables which normally take the pressure of one table against the next. The skeleton table 1 is supported and guided in the same way as the work tables 2 on guides 7 on a supporting frame 8, and it is provided with guiding surfaces 4, engaging the guides 7, the guiding surfaces 4 (shown in dotted lines in Figure 1) being in line with the guiding surfaces of the work tables, but of small area, sufficient to carry only the weight of the table 1.

The central portion of the table 1 is of comparatively small section, being strong enough only to take the driving end thrust. Thus, in the table shown, the central portion is narrow so as to expose the guides on which the tables slide.

Further, when the tables are driven by pinions engaging racks on the tables, such as the pinion 9 with shaft 10 in bearings 11, the skeleton table 1 is provided with a rack 5 similar to those on the work tables, and openings 6 are provided to give access to the bearings of the pinions engaging these racks.

Since the table 1 moves from one end of the apparatus to the other during the operation of the apparatus, an examination of all the guiding surfaces and of the driving mechanism can be made during such operation.

Further, since the table takes several minutes to pass a given point, minor repairs or adjustments can often be effected without stopping the apparatus, while for a more serious repair, the skeleton table can be brought to the desired point during the operation of the grinding apparatus which need only then be stopped, and the repair effected with the table in position. The apparatus can then at once be put into operation again. The grinding apparatus is therefore stopped only during the actual time of repair.

The skeleton table may be of any form and construction adapted to give convenient access to the particular types of guiding and driving means employed, provided that it is capable of taking the place of a working table in the series of tables and travelling with the series, without, however, carrying glass or bearing the weight of the runners.

Having described my invention, I declare that what I claim and desire to secure by Letters Patent is:—

1. In continuous glass grinding and polishing apparatus employing a series of travelling work tables, a skeleton table adapted to take the place of a work table in the series, so constructed as to give access during its travel to apparatus beneath the series of tables.

2. In continuous glass grinding and polishing apparatus employing a series of travelling work tables, a skeleton table adapted to take the place of a work table in the series, comprising a framework having end surfaces adapted to abut against the end surfaces of the work tables, guiding surfaces on its underside in line with the guiding surfaces of the work tables and a recess in each side permitting access to the guides.

3. In continuous glass grinding and polishing apparatus employing a series of travelling work tables, a skeleton table adapted to take the place of a work table in the series, comprising a framework having end surfaces adapted to abut against the end surfaces of the work tables, guiding surfaces on its underside in line with the guiding surfaces of the work tables, and openings between its ends permitting access to apparatus beneath the tables.

4. In continuous glass grinding and polishing apparatus employing a series of travelling work tables, a skeleton table adapted to take the place of a work table in the series, comprising a framework having end surfaces adapted to abut against the end surfaces of the work tables, guiding surfaces on its underside in line with the guiding surfaces of the work tables, a recess in each side permitting access to the guides and openings between its ends permitting access to apparatus beneath the tables.

5. In continuous glass grinding and polishing apparatus employing a series of travelling work tables, a skeleton table adapted to take the place of a work table in the series, comprising a framework having relatively broad end portions with end surfaces adapted to abut against the end surfaces of the work tables, guiding surfaces on the underside of each such end portion in line with the guiding surfaces of the work tables, and a relatively narrow central portion forming a recess along each side permitting access to the guides.

6. In continuous glass grinding and polishing apparatus employing a series of travelling work tables, a skeleton table adapted to take the place of a work table in the series, comprising a framework having relatively broad end portions with end surfaces adapted to abut against the end surfaces of the work tables, guiding surfaces on the underside of each such end portion in line with the guiding surfaces of the work tables, a relatively narrow central portion forming a recess along each side permitting access to the guides and openings in the body of said central portion permitting access to apparatus beneath the tables.

In testimony whereof I have affixed my signature hereto.

FREDERIC BARNES WALDRON.